US011094320B1

(12) United States Patent
Jain et al.

(10) Patent No.: US 11,094,320 B1
(45) Date of Patent: Aug. 17, 2021

(54) DIALOG VISUALIZATION

(71) Applicant: Amazon Technologies, Inc., Seattle, WA (US)

(72) Inventors: Vikas Jain, Bellevue, WA (US); Shishir Sridhar Bharathi, Bellevue, WA (US); Giuseppe Pino Di Fabbrizio, Brookline, MA (US); Ling Hu, Bothell, WA (US); Sumedha Arvind Kshirsagar, Seattle, WA (US); Shamitha Somashekar, Cupertino, CA (US); John Daniel Thimsen, Seattle, WA (US); Tudor Toma, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/579,699

(22) Filed: Dec. 22, 2014

(51) Int. Cl.
*G06F 3/0481* (2013.01)
*G10L 15/08* (2006.01)
*G10L 15/22* (2006.01)

(52) U.S. Cl.
CPC ............ *G10L 15/22* (2013.01); *G06F 3/0481* (2013.01); *G10L 15/08* (2013.01); *G10L 2015/223* (2013.01); *G10L 2015/225* (2013.01)

(58) Field of Classification Search
CPC ........................................................ G10L 15/22
USPC ........................................................ 704/235
See application file for complete search history.

(56) References Cited

U.S. PATENT DOCUMENTS

| | | | | |
|---|---|---|---|---|
| 6,370,503 B1* | 4/2002 | Ortega | .................... | G10L 15/22 704/235 |
| 6,421,655 B1* | 7/2002 | Horvitz | .................... | G06N 5/04 706/61 |
| 6,686,937 B1* | 2/2004 | Cragun | .................... | G06F 8/38 715/762 |
| 7,130,391 B2* | 10/2006 | Janakiraman | ..... | H04M 1/72563 379/201.03 |
| 7,499,861 B2* | 3/2009 | Danieli | .................... | G10L 15/18 704/270 |
| 7,729,912 B1* | 6/2010 | Bacchiani | ............... | G10L 15/32 704/236 |
| 8,340,971 B1* | 12/2012 | Abella | .................. | H04M 3/493 704/1 |
| 9,070,366 B1* | 6/2015 | Mathias | ................ | G06F 17/279 |
| 9,794,137 B2* | 10/2017 | Huang | ................ | H04L 41/5064 |
| 2001/0021909 A1* | 9/2001 | Shimomura | ............ | G10L 15/22 704/275 |
| 2002/0169594 A1* | 11/2002 | Yasuda | ................ | G06F 17/279 704/5 |

(Continued)

*Primary Examiner* — Daniel C Washburn
*Assistant Examiner* — Oluwadamilola M Ogunbiyi
(74) *Attorney, Agent, or Firm* — Lee & Hayes, P.C.

(57) ABSTRACT

Dialog visualizations are created to enable analysis of interactions between a user and a speech recognition system used to implement user commands. Spoken commands from the user may be classified, along with system responses to the spoken commands, to enable aggregation of communication exchanges that form dialog. This data may then be used to create a dialog visualization. The dialog visualization may enable an analyst to visually explore different branches of the interactions represented in the dialog visualization. The dialog visualization may show a trajectory of the dialog, which may be explored in an interactive manner by the analyst.

20 Claims, 11 Drawing Sheets

(56) References Cited

U.S. PATENT DOCUMENTS

| | | | |
|---|---|---|---|
| 2004/0006480 A1* | 1/2004 | Ehlen | G10L 15/22 704/276 |
| 2005/0055205 A1* | 3/2005 | Jersak | G10L 15/22 704/233 |
| 2005/0105712 A1* | 5/2005 | Williams | G10L 13/027 379/265.02 |
| 2005/0165607 A1* | 7/2005 | Di Fabbrizio | G06F 17/2785 704/256 |
| 2006/0100875 A1* | 5/2006 | Schmidt | G10L 15/22 704/257 |
| 2006/0256937 A1* | 11/2006 | Foreman | G06Q 10/00 379/88.08 |
| 2007/0005369 A1* | 1/2007 | Potter | G10L 15/01 704/275 |
| 2007/0233497 A1* | 10/2007 | Paek | G10L 15/22 704/270 |
| 2008/0004880 A1* | 1/2008 | Acero | G10L 15/22 704/270.1 |
| 2008/0154579 A1* | 6/2008 | Kummamuru | G06F 16/685 704/9 |
| 2008/0319748 A1* | 12/2008 | Nakano | G10L 15/1822 704/251 |
| 2009/0119586 A1* | 5/2009 | Weng | G06F 8/30 715/705 |
| 2009/0171669 A1* | 7/2009 | Engelsma | G10L 15/22 704/275 |
| 2009/0306981 A1* | 12/2009 | Cromack | G06F 17/30743 704/235 |
| 2010/0076760 A1* | 3/2010 | Kraenzel | G10L 15/18 704/235 |
| 2010/0131274 A1* | 5/2010 | Stent | G10L 15/183 704/257 |
| 2010/0158097 A1* | 6/2010 | Pascal | G06Q 10/107 375/240 |
| 2010/0177877 A1* | 7/2010 | Hamaker | H04M 3/53358 379/88.14 |
| 2010/0305945 A1* | 12/2010 | Krishnaswamy | G10L 15/26 704/235 |
| 2011/0037766 A1* | 2/2011 | Judy | G06T 11/206 345/440 |
| 2012/0041903 A1* | 2/2012 | Beilby | G06N 20/00 706/11 |
| 2012/0151279 A1* | 6/2012 | Armstrong | G06F 11/0793 714/48 |
| 2012/0297174 A1* | 11/2012 | Frank | G06F 9/5011 713/1 |
| 2013/0282380 A1* | 10/2013 | Mauro | G06Q 20/305 704/275 |
| 2013/0283168 A1* | 10/2013 | Brown | G06F 3/165 715/728 |
| 2013/0339021 A1* | 12/2013 | Deshmukh | G10L 15/18 704/257 |
| 2014/0032471 A1* | 1/2014 | Reddy | G10L 15/22 706/47 |
| 2014/0035920 A1* | 2/2014 | Duwenhorst | G06T 11/001 345/440 |
| 2014/0040274 A1* | 2/2014 | Aravamudan | G06F 16/3322 707/741 |
| 2014/0122084 A1* | 5/2014 | Salimi | G10L 15/1822 704/275 |
| 2014/0136212 A1* | 5/2014 | Kwon | G10L 15/22 704/275 |
| 2014/0149115 A1* | 5/2014 | Milstein | G10L 15/06 704/235 |
| 2014/0184494 A1* | 7/2014 | Burachas | G06F 3/011 345/156 |
| 2014/0188986 A1* | 7/2014 | Levy | H04W 4/029 709/203 |
| 2014/0195517 A1* | 7/2014 | Buchheit | G06F 16/248 707/722 |
| 2014/0215322 A1* | 7/2014 | Gunderson | G06F 40/114 715/251 |
| 2014/0278427 A1* | 9/2014 | Riviere Escobedo | G10L 15/22 704/257 |
| 2015/0012829 A1* | 1/2015 | Brown | G06F 3/167 715/728 |
| 2015/0040052 A1* | 2/2015 | Noel | G06F 3/04847 715/771 |
| 2015/0066479 A1* | 3/2015 | Pasupalak | G06F 17/27 704/9 |
| 2015/0081701 A1* | 3/2015 | Lerios | G06F 17/30876 707/736 |
| 2015/0120296 A1* | 4/2015 | Stern | G10L 15/30 704/236 |
| 2015/0121181 A1* | 4/2015 | Joshi | G06F 17/211 715/202 |
| 2015/0142704 A1* | 5/2015 | London | G06N 5/04 706/11 |
| 2015/0179170 A1* | 6/2015 | Sarikaya | G10L 15/22 704/275 |
| 2015/0189086 A1* | 7/2015 | Romano | H04M 3/5175 379/265.09 |
| 2015/0286625 A1* | 10/2015 | Escarguel | G06F 16/156 715/220 |
| 2015/0302846 A1* | 10/2015 | Song | H04W 56/001 704/275 |
| 2016/0062604 A1* | 3/2016 | Kraljic | G06F 3/0482 715/771 |
| 2016/0092462 A1* | 3/2016 | Raj | G06Q 10/101 707/704 |
| 2016/0098994 A1* | 4/2016 | Gelfenbeyn | G10L 15/22 704/9 |
| 2016/0144178 A1* | 5/2016 | Hillbratt | A61N 1/36038 607/57 |
| 2016/0155442 A1* | 6/2016 | Kannan | G06F 3/167 704/275 |
| 2016/0163311 A1* | 6/2016 | Crook | G10L 15/065 704/275 |
| 2018/0007099 A1* | 1/2018 | Ein-Gil | G06F 9/468 |
| 2018/0083908 A1* | 3/2018 | Dotan-Cohen | H04L 51/24 |
| 2019/0042627 A1* | 2/2019 | Osotio | G06Q 10/10 |
| 2019/0251339 A1* | 8/2019 | Hawker | G06F 3/0488 |

* cited by examiner

US 11,094,320 B1

DIALOG VISUALIZATION

BACKGROUND

Many different techniques have been introduced to allow users to interact with computing devices, such as through mechanical devices (e.g., keyboards, mice, etc.), touch screens, motion, gesture, and even through natural language input such as speech. Furthermore, many of these devices are further connected to remote computing resources, such as cloud-based resources, that extend functionality afforded by the local devices.

As computing devices in homes and offices continue to evolve, users expect a more seamless and timely experience when interacting with cloud-based resources through local devices. Additionally, users expect a more robust set of services when interacting with cloud-based resources through local devices. In particular, users expect accurate, intuitive, and relatively quick interactions with computing devices in order to instruct the computing devices to perform desired functions.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
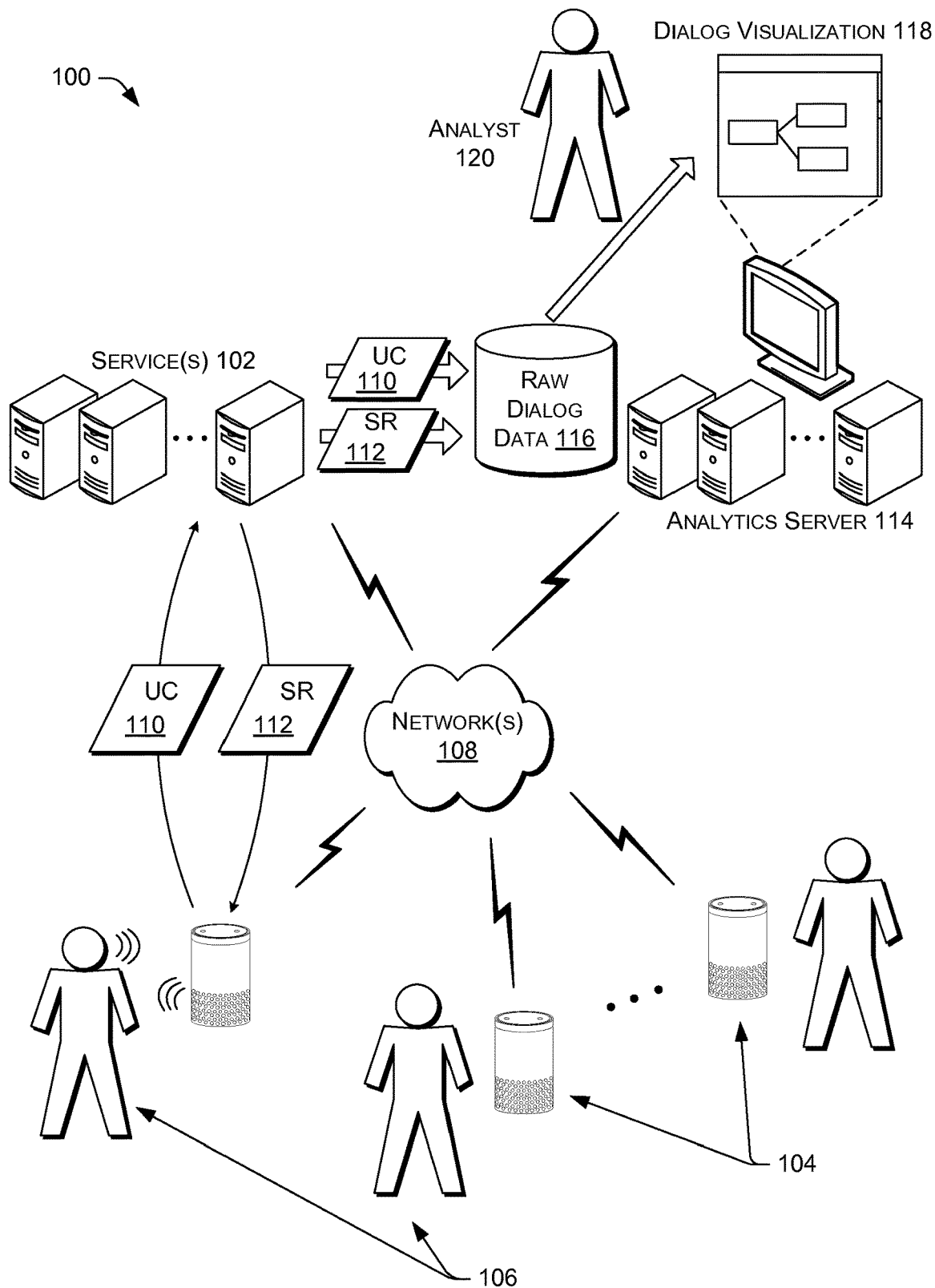
FIG. 1 is a schematic diagram of an illustrative computing environment usable to monitor interactions between users and user devices, and to create dialog visualizations to modify and improve the user interactions with the user devices.

This disclosure is directed to creating dialog visualizations to enable analysis of interactions between a user and a speech recognition system (or device) used to implement user commands. Dialog exchanged between users and a speech recognition system may be captured and stored for later analysis. Spoken commands from the users may be classified, along with system responses to the user commands, to enable aggregation of communication exchanges that form dialog. This data may then be used to create a dialog visualization. The dialog visualization may be formed as a tree structure that enables an analyst to explore different branches of the interactions represented in the dialog visualization. However, other structures may be used besides a tree structure, such a cluster diagram that includes elements (or nodes) depicting pathways in a dialog. The dialog visualization may show a trajectory of the dialog, which may be explored in an interactive manner by an analyst.

In some embodiments, the analyst may identify, via the dialog visualization, a problematic path or user difficulty based on a percent or quantity of users that do not achieve a goal indicated in corresponding user audio (user speech) or based on the number of interactions used to achieve the goal. A goal is an objective of a user, such as to play music, store data, retrieve information, and so forth, which is typically apparent in a user command spoken to the user device. Thus, not only do users desire to achieve their goal, but often users have expectations about how long such goals should take to achieve. When a user does not achieve his goal in an expected amount of time, the user is likely to quit or discontinue a task, which is an undesirable outcome. By visualizing dialog between users and a speech recognition system and/or device, the dialog visualization may enable better and earlier identification of these problematic paths. Specific actions may then be deployed to improve the interactions, thereby reducing or eliminating at least some identified problematic paths.

In various embodiments, different types of content classifiers may be used to extract information from the user interaction with the speech recognition system. The content classifiers may convert spoken words (from audio files) into text, identify commands and/or goals in spoken words, and/or otherwise classify user input and/or system response for later processing. Some content classifiers may rely completely on user input, some may be fully automated, and some may use a hybrid classification approach that uses both human and machine-implemented techniques. By selecting among these content classifiers, different types of data may be analyzed, which in turn may enable different levels of analysis of dialog between users and the speech recognition system. In accordance with one or more embodiments, areas of the dialog visualization may be prioritized for analysis, such as by analyzing the interactions and/or percent of goals attained without having an analyst explore the dialog visualization in great detail. In some embodiments, the dialog visualization may be used to predict future interaction based on how closely a new interaction (task, goal, command set, etc.) correlates to an existing interaction.

The techniques and systems described herein may be implemented in a number of ways. Example implementations are provided below with reference to the following figures.

FIG. 1 is a schematic diagram of an illustrative computing environment 100 usable to monitor interactions between users and user devices, and to create dialog visualizations to modify and improve the user interactions with the user devices. The environment 100 may include one or more services 102 that exchange data with user devices 104 that are associated with respective users 106. In some embodiments, the services 102 may include a host that facilitates exchanges between the user devices 104 and the services 102. However, the user devices 104 may exchange data with the services 102 directly without use of a host. The user devices 104 may be electronic devices that are at least partially controlled using speech commands issued by users 106. In some embodiments, the user devices 104 may be dedicated speech recognition devices that include few or no other input controls (e.g., few or no buttons, motion devices, imaging devices, etc.). Instead, the user devices 104 may receive input from users by receiving spoken commands, which are converted to signals by the user devices 104 and/or by a cloud computing service using automated speech recognition (ASR), and then processed, such as by an exchange of data to one of the services 102 or by the user device locally (e.g., by playing music, etc.). The services 102 may be any services that provide data to the user devices 104 in response, directly or indirectly, from the user devices 104. The services 102 need not be configured for ASR since ASR may be performed prior to sending a request to one of the services in some instances. The services 102 may provide any type of information, entertainment, or data, such as by proving streaming media, directions, documents, performing tasks (adding things to lists, setting reminders, etc.), and so forth. The services 102 and the user devices 104 may be in communication via one or more networks 108, which include wired and/or wireless networks.

An exchange between a service and a user device may be quantified as "turns", which measure a number of back-and-forth exchanges of spoken commands and system responses. A goal may be satisfied (or unsatisfied) after one or more turns occur. Each turn may have a turn status (e.g. correct, endpoint, ASR, NLU-intent, NLU-slot, entity res., confirmation, result, etc.) while each goal may have a goal status (e.g., success, alternate action, un-actionable, incorrect, system error, user abandoned, etc.). When a user asks a question or issues a user command (UC) 110, the UC 110 may be received by the user device and possibly by a service. The user device and/or the service may, in turn, process the UC 110 and generate a system response (SR) 112, which may be issued back to the user in the form of action (playing music, storing data), by causing audio (a question to the user, etc.), or by inaction (e.g., timeout, termination, etc.). This single back and forth exchange is referred to herein as a single "turn". While some requests may be satisfied in a single turn, other requests may require or include multiple turns before the user achieves an intended goal. As a first example, the user may ask "what time is it?", which may be issued as the UC 110 to a service. The service may generate a reply causing the SR 110 of "10:44 pm."

As a second example, the user may issue a command "play music" to the user device as the UC 110. The user device may respond with the SR 112 of "what station would you like me to play?". In a second turn, the user may state "the new age station" as another instance of the UC 110. Next, the user device may begin to play the new age station, as the SR 112. This second example illustrates a two turn dialog. However, in the second example, the user may have been able to achieve the goal (play the new age music station) if the user issued a more complete initial instance of the UC 110. The second example also illustrates that the user device may respond to at least some request/commands from the user without accessing the services 102, such as when the user device is capable of performing ASR. Thus, the UC 110 and the SR 112 may be processed locally in some instances. Another example of a turn is the system requesting the user to repeat a command. Many other examples exist, which include a cause/reaction interaction between the user and another device, such as the user device and/or the services 102.

The interactions between the user, user device, and/or the services are referred to herein as "dialog." This dialog may include audio portions and text-based portions, which includes signals. Meanwhile, an analytics server 114 (or simply "the server 114") may capture or receive at least some of the exchanges between the user, the user device, and/or the services via the UC 110 and the SR 112, and store this information as raw dialog data 116. The raw dialog data 116 may include audio data of the user's speech, text-based commands generated by the user device and/or services, and/or other data generated during communication exchanges. The servers 114 may store complete exchanges in the raw dialog data 116, such that the exchanges that terminate with our without achievement of a goal, thereby enabling analysis of these exchanges using a dialog visualization 118 generated by the servers 114 using the raw dialog data 116. An analyst 120 may interact with the dialog visualization 118 to determine problem paths/points in dialogs and/or other instances where the users may experience a low rate of achieving a goal and/or may experience a greater number of turns than expected to achieve a goal. Additional details about the processing by the server 114 are discussed next.

Figure 2:
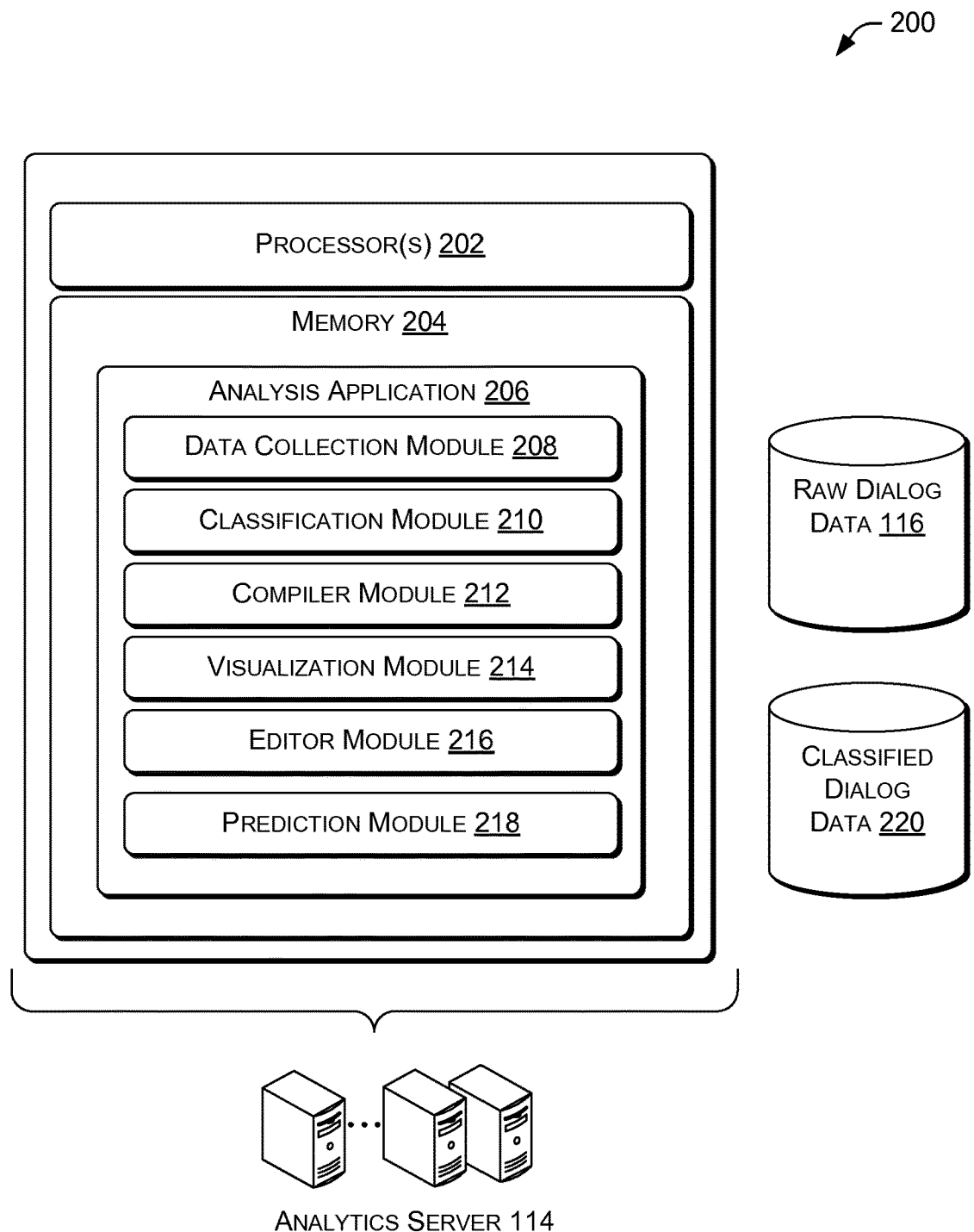
FIG. 2 is a block diagram of an illustrative computing architecture to create dialog visualizations.

FIG. 2 is a block diagram of an illustrative computing architecture 200 of the server 114 to create dialog visualizations. The computing architecture 200 may be implemented in a distributed or non-distributed computing environment. The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store an analysis application 206 that may include a data collection component 208, a classification module 210, a compiler module 212, a visualization module 214, an editing module 216, and a prediction module 218. The application and modules are described in turn. The servers 114 may have access to the raw dialog data 116 and classified dialog data 220. The modules may be stored together or in a distributed arrangement.

The data collection component 208 may compile the raw dialog data 116. For example, the data collection component 108 may receive data from the user devices 104 and/or from the services 102 to populate the raw dialog data 116. The raw dialog data 116 may include audio files of user commands and resulting instructions, data, and/or actions performed by the user device and/or the services. This data may then be analyzed to determine mistakes by users, mistakes by the user devices, and/or mistakes by the services. Examples of mistakes may include incorrect results from ASR, incomplete commands, and so forth. The raw dialog data 116 may associate data from devices for different exchanges, such as by time stamping data, using unique identifiers, and/or using other techniques.

The classification module 210 may convert the raw dialog data 116 to classified dialog data 220. The conversion may be performed at least partly with human intervention. For example, a human may listen to the audio spoken by a user as the UC 110, which is stored in the raw dialog data 116, and transcribe that audio as a command via the classification module 210 (in this example, acting as user interface for data entry). The human may also populate other metadata associated with an exchange, such as a goal, a command, slots (variables and/or other information used by a command), and/or other information. In some instances, the human may count the number of turns associated with the exchange. This data may be stored in the classified dialog data 220, which may enable search and running of queries to create the dialog visualization. In various embodiments, at least some of the classification may be performed by the server 114. Further details about the classification are discussed with reference to FIG. 8.

The compiler module 212 may compile the classified dialog data 220. For example, the compiler module 212 may execute a query to aggregate data of similar commands, thereby supplying information to the visualization module 214. For example, the compiler module 212 may receive an analyst's query input using a query tool. The compiler module 212 may then compile the underlying data to respond to the query.

The visualization module 214 may access the results of the compiler module 212 and use this data to create a dialog visualization, such as the dialog visualization 118 shown in FIG. 1. The visualization module 214 may insert data into visual fields, objects, and/or other elements (or nodes), which may enable user interaction to explore the raw data (which has been classified and compiled). By compiling the data, the visualization module 214 may allow the analyst 120 to view different outcomes of a command that is associated with a goal. For example, a command (the UC 110) may result in various different numbers of turns depending on the exact UC 110, the user device, the services, and other actors/entities involved in an exchange. Often, the visualization module 214 may group information by a goal, which may be determined by the classification module 210. In some embodiments, the visualization module 214 may present visual data in tree structure, which shows different outcomes as different branches, possibly organized under respective turns. The visualization module 214 may present the tree structure in a condensed form, but reveal different details associated with branches in response to user exploration. In various embodiments, the visualization module 214 may indicate or recommend areas for exploration, such as by using coding (colors, sizes, etc.), showing some branches as expanded prior to user interaction, and so forth. However, other visual representation besides a tree structure may be used, such as a cluster diagram, hierarchy structure, tagged structure, or other types of relational structures.

The editing module 216 may enable the analyst 120 or another person to modify software, hardware settings, and/or other controls to adjust operation of one or more of the user device 104 and/or one or more of the services 102. For example, the analyst 120 may modify a setting, firmware, or a control in response to identifying a common problem via the dialog visualization via the visualization module 214.

The prediction module 218 may analyze and/or predict possible outcomes of a task, a command, or other operation performed by one of the user devices 104 and/or the services 102, possibly prior to use of the new task, command, and/or operation. The prediction module 218 may associate the new task, command, and/or operation with one or more existing task/command/operations, such as to leverage the visual data for the existing task/command/operations for prediction purposes. Operation of the prediction module 218 is explained in further detail with respect to FIG. 10.

FIGS. 3, 4, and 8-10 are flow diagrams of illustrative processes that are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
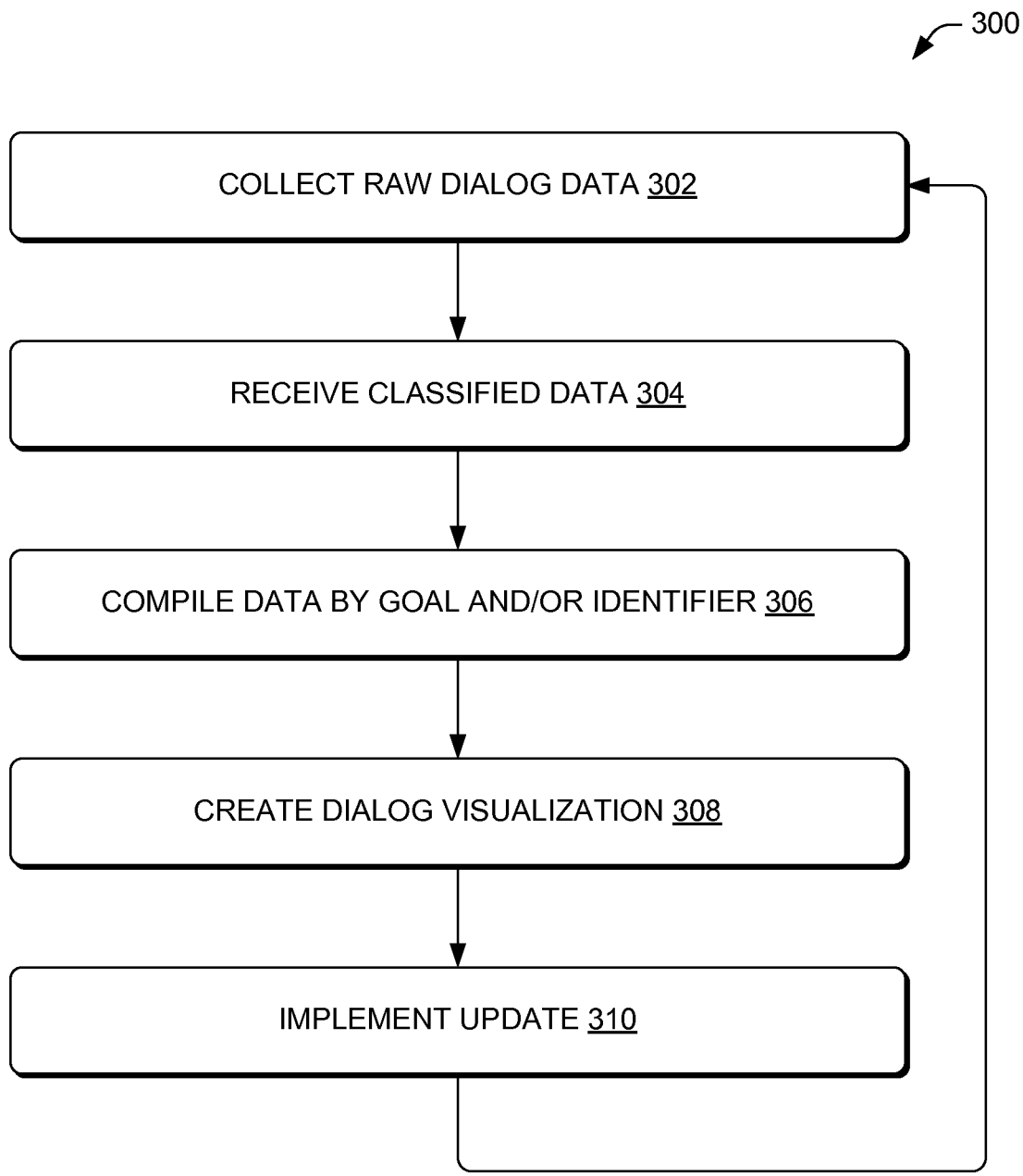
FIG. 3 is a flow diagram of an illustrative process to collect raw data and transform the raw data into dialog visualization for analysis.

FIG. 3 is a flow diagram of an illustrative process 300 to collect raw audio data and transform the raw audio data into dialog visualization for analysis. The process 300 is described with reference to the environment 100 and the computing architecture 200, and may be performed by server 114.

At 302, the data collection module 208 may collect or receive the raw dialog data 116. For example, the raw data may be at least temporarily stored by the user device, and uploaded to the server 114, possibly via batch processes during non-peak use times, to provide the raw data. However, the raw data may be collected by many other techniques as well, such as by receipt from a host (e.g., one of the services 102) that coordinates operations of the user devices 104, when a host is used.

At 304, the classified data may be received or determined and stored as the classified dialog data 220. For example, the classification module 210 may provide an interface for humans to input transcribed data from the raw dialog data. The transcription may include a transcription of user commands (e.g., the UC 110), as well as determination of intended goals, commands, slots, parameters, and/or other data from the user. The transcription may also include an identifier related to an exchange (or turn) to other exchanges/turns involving the same goal during a same session (time range) for a specific user device. This way, the classified data may include a complete picture of an exchange between a user and a user device that resulted in one or more turns to achieve a goal or not achieve a goal (e.g., end in error, timeout, etc.).

At 306, the compiler module 212 may compile the data by a goal and/or an identifier associated with related exchanges. For example, the compiler module may perform the compilation in response to issuance of a query via an analyst query tool. The query tool may include a various parameters for the query, which causes the compilation. The parameters may include a date range, a number or range of turns, a goal, a goal status (e.g., success, failure, timeout, etc.), and/or a data source (when different data sources are available, such as from different user devices and/or different ones of the services 102).

At 308, the visualization module 214 may create the dialog visualization 118 to show visual results of the query and compiled data from the operation 306. The visualization module 214 may be formed as a tree structure that includes branches. The branches may be initially presented in a first state, but may be modified through user interaction to reveal a second, third, or other different states, each providing different levels of detail, thereby allowing the analyst 120 to explore decision points within execution of a goal. The visualization module 214 may use codes to highlight important information, auto expand areas of interest, and/or otherwise provide indications that may assist the analyst in interpretation of the visual data.

At 310, the editor module 218 may be used to implement an update, possibly to firmware or other settings, such as in response to identifying a problem in exchanges via the dialog visualization 118 per the operation 308, and determining a solution (the update). The update may include changing settings, updating software, changing parameters, and/or other changes, which may be deployed to the user device, one or more of the services, and/or other entities that interact with the user to create the dialog visualization. For example, exploration of the dialog visualization may reveal that a high percent of users experience a timeout when attempting to perform a particular goal. An analyst may determine that a different instruction, when issued by the user device, may guide the user to provide a response that is understandable and actionable by the user device. The operation 310 may be used to implement that instruction, for example. Of course, many other types of updates may be performed. In some embodiments, the updates may be released in a batch process, such as to provide a full version update or incremental update. In various instances, back end software may be updated at different intervals, even including once-off changes to fix identified "bugs" or other issues possibly discovered via the dialog visualization.

The dialog visualization may answer a number of possible questions. Some sample question follow. What percent of utterances in each turn have a correct and false interpretation? What percent of utterances in each turn were performed by the user using a one-step correction after a system's false interpretation? What percent of utterances in each turn generate a response to a general "please try again" prompt from a low-intent confidence outcome in the previous turn? What percent of those reprompt responses is recognized correctly with high confidence? What percent of utterances in each turn are a response to a missing-slot prompt from the previous turn? What percent of utterances in each turn is a response to a slot confirmation prompt from the previous turn? Other questions may also be answered, directly or indirectly, by the dialog visualization or by use/inspection of the dialog visualization.

Figure 4:
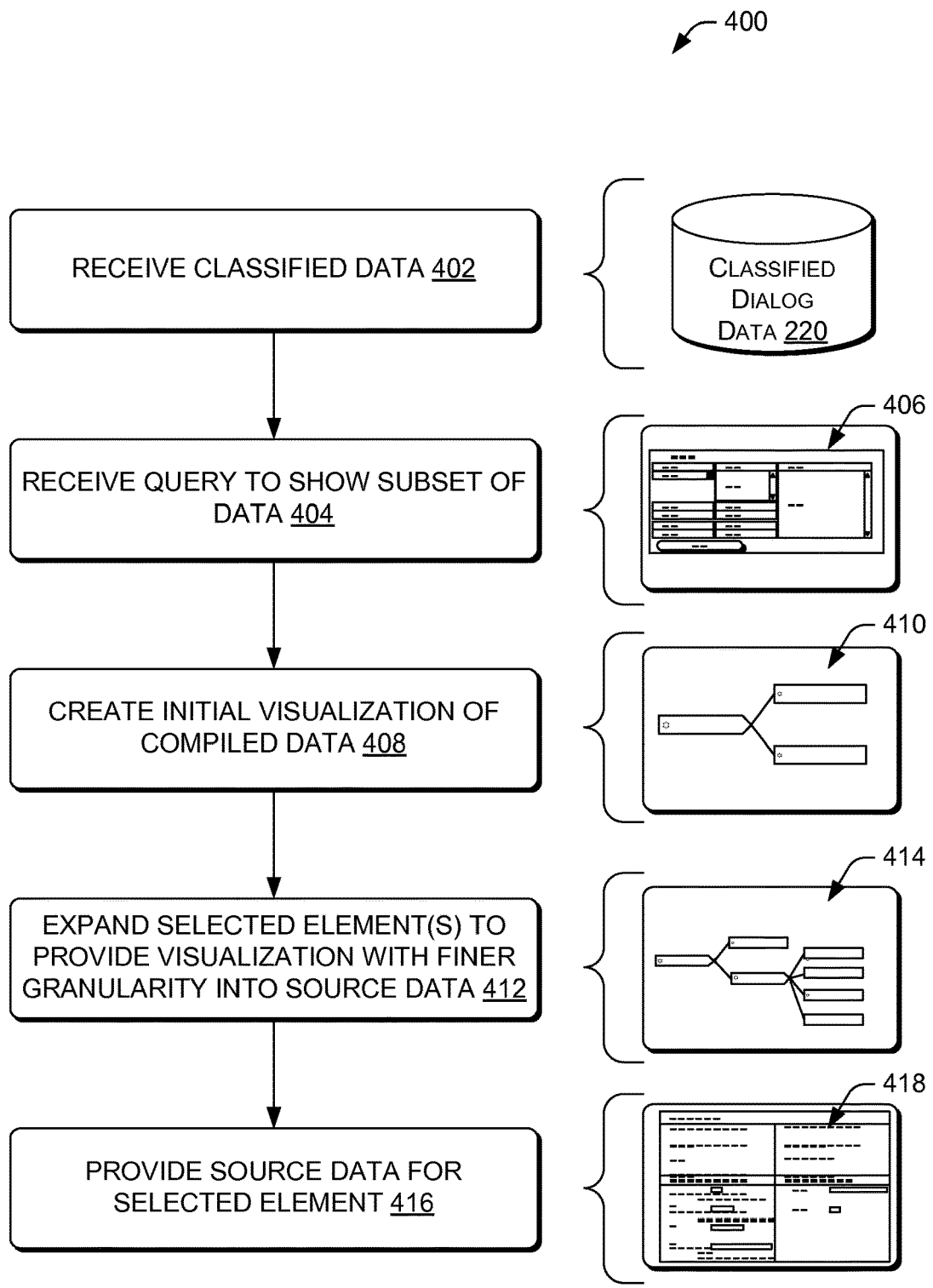
FIG. 4 is a pictorial flow diagram of an illustrative process to interact with a dialog visualization to identify difficulties in dialogs.

FIG. 4 is a pictorial flow diagram of an illustrative process 400 to interact with a dialog visualization to identify dialog difficulties. The process 400 is described with reference to the environment 100 and the computing architecture 200, and may be performed by server 114. The process 400 shows illustrative user interfaces and dialog visualizations corresponding to some of the described operations.

At 402, the classified dialog data may be received via the classification module 210. In some embodiments, this may be the initial input for the servers 114. However, in some embodiments, the servers 114 may receive the raw data to create at least a portion of the classified dialog data 220 via an automated process.

At 404, the compiler module 212 may receive a query to show a subset of the classified data in a dialog visualization. The compiler module 212 may receive the query via a query form 406, which is shown in greater detail in FIG. 5. The query form 406 may include a goal, a range of turns, source data, and/or other parameters.

At 408, the visualization module 214 may create an initial dialog visualization 410 based on the results of the query from the operation 404. The initial dialog visualization 410 is shown in greater detail in FIG. 6A. The initial dialog visualization 410 may include minimal branches of a tree structure representing the dialog compiled at the operation 404, such as a first group of branches that extend from a goal. The initial dialog visualization 410 may be organized by turn (exchange) or may be representative of multiple turns.

At 412, the visualization module 214 may expand or otherwise reveal additional data 414 associated with selected elements (or nodes) in the dialog visualization. The additional data 414 may include finer granularity of details in the dialog shown by the dialog visualization. In some instance, the additional data 414 may show specific instances of dialog from the classified dialog data 220. The operation 412 may be repeatedly performed to explore different branches or other dialog visualizations, while in some instances collapsing other dialog visualizations to remove clutter or for other reasons. By repeating the operation 412 in response to selection of different parts of the dialog visualization, the analyst 120 may explore different parts (routes, branches) that take place in a dialog to achieve a goal, thereby unearthing or discovering problem areas where the system or result was not as expected. The analyst 120 may use this information to update or otherwise improve the system.

At 416, the visualization module 214 may provide a detailed entry 418 of the classified dialog data 220 or the raw dialog data 116 for a selected element. This may be a highest level of detail accessible via the dialog visualization, since this the input data. This may enable the analyst 120 to explore an exact user exchange during an analysis. Of course, exploration of the dialog visualization may enable moving from the operation 416 to the operation 412, and so forth to interact with the dialog visualization and explore different branches, expand branches, collapse branches, run other queries, and so forth.

Figure 5:
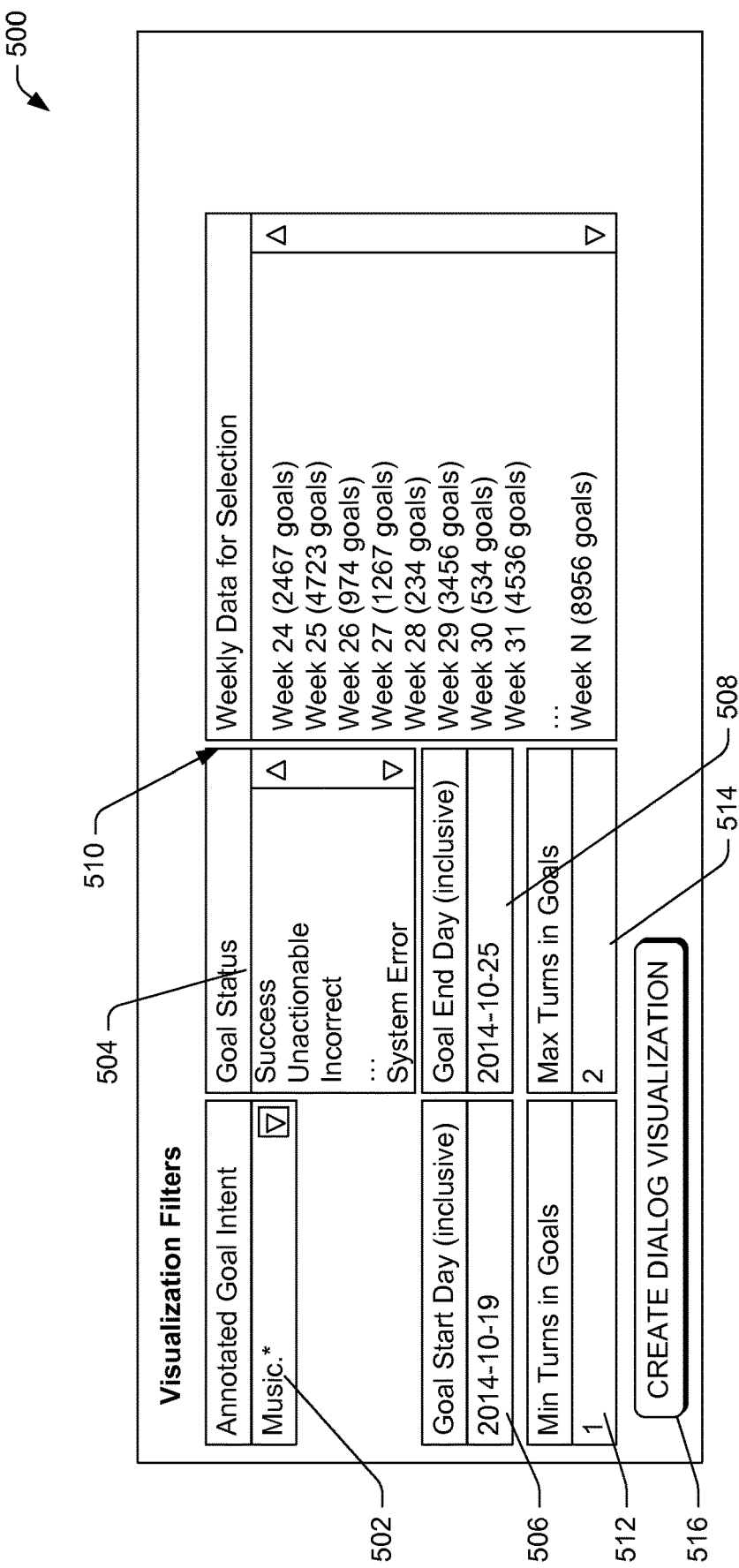
FIG. 5 is schematic diagram of an illustrative query tool for selecting parameters for a dialog visualization.

FIG. 5 is schematic diagram of an illustrative query tool 500 for selecting parameters for a dialog visualization. The illustrative query tool 500 may be the same as or similar to the query tool 406 discussed above. The query tool 500 may be used by the compiler module 212 to initiate a query to obtain classified data and compile the data (e.g., aggregate the data, etc.). The result may then be transformed into the dialog visualization by the visualization module 214. The query tool 500 may be used by an analyst to generate the dialog visualization, such as the dialog visualization 118 discussed with reference to FIG. 1.

The query tool 500 may include a goal selection field 502 that allows an analyst 120 to select or input a goal to analyze. The goal may be selected from a list of possible goals or may be inputted as a text entry. For example, the goals may be the goals identified in the classification process performed by the classification module 210. A goal status field 504 may enable selection of a specific resolution of the goal. However, the dialog visualization may be generated without input of a goal status. In this situation, the visualization may provide access to all goal statuses via the tree structure. A goal start field 506 and goal end field 508 may enable input of time parameters. A time group data selector 510 may be used to input a week's worth of data (or other predetermined data grouping). The time group data selector 510 may enable periodic reviews, such as for reporting and/or regular maintenance/review of the dialog visualization. A minimum turns field 512 and a maximum turns field 514 may enable input of parameters for turns (quantity of exchanges). The query may be submitted and/or caused to be executed by the compiler module 212 in response to selection of a command 516. A possible result of use of the query tool 500, and selection of the command 516, is shown in FIGS. 6A and 6B, and described next.

Figure 6A:
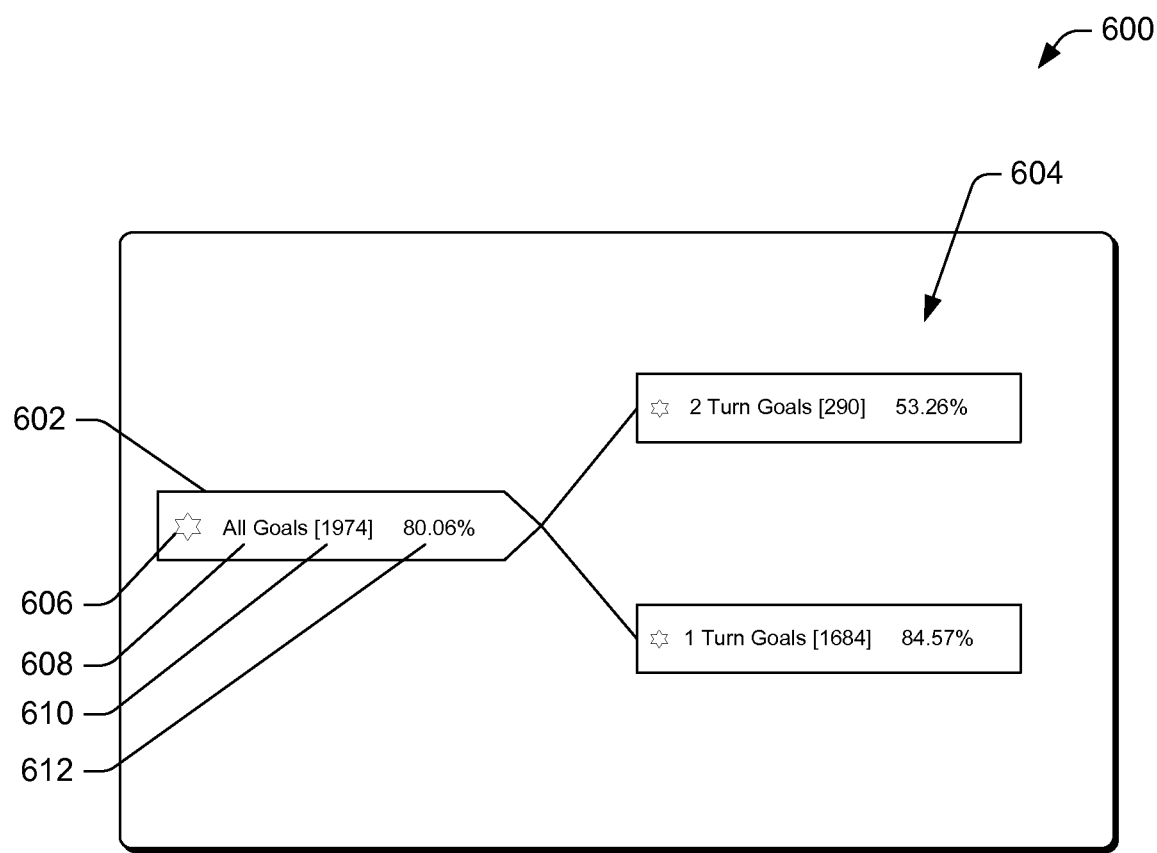
FIGS. 6A and 6B are schematic diagrams of illustrative dialog visualizations.
Figure 6B:
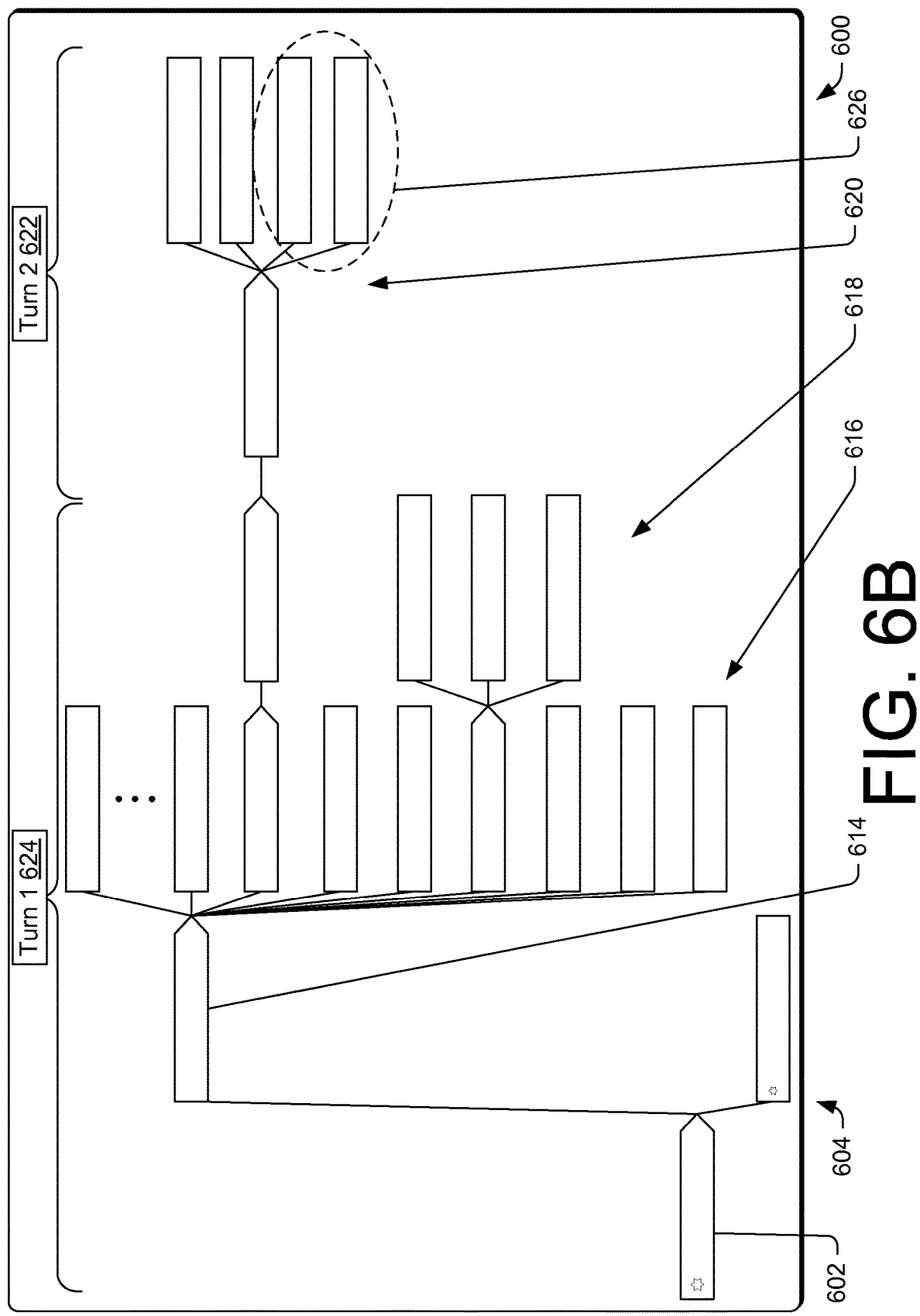

FIGS. 6A and 6B are schematic diagrams of an illustrative dialog visualization 600. FIG. 6A shows an initial representation of the dialog visualization while FIG. 6B shows an exploded view of the dialog visualization after exploration by an analyst.

As shown in FIG. 6A, the dialog visualization may include a tree structure that includes a starting element 602 and multiple elements 604 that extend from the starting element 602. Each of the elements (which can also be referred to as "nodes") may include various components that provide information about the element and/or dialog. The elements may also include codes, such as icons, colors, different shapes, and/or other information to draw attention to certain elements, such as elements with a low success rate of achieving the goal, for example. An icon 606 may indicate, based on size, shape, or other attributes, information about a type of element, significance, and/or importance of the element. For example, a larger icon may represent more users experience this element than an element with a smaller icon of the same type. A description 608 may indicate information about the element or position in the tree structure. A quantity 610 may indicate a number of occurrences of this element in the raw dialog data. A goal percent 612 may indicate a number of the users that attained their goal from this element.

As shown in FIG. 6B, an element 614 is expanded in the dialog visualization 600, thus showing additional layers of elements that extend from the element 614, such as elements 616. Some of the elements 616 may further be expanded, as shown by elements 618 and elements 620. The elements 620 may be associated with a second turn 622, while the other elements 602, 604, 616, 618 may be associated with a first turn 624. The elements shown in FIG. 6B may include at least some of the attributes discussed above with reference to the element 602. In addition, some elements may be endpoints where a goal was achieved or not achieved (e.g., via termination, a timeout, etc.). Thus, many different outcomes may occur for some goals, as represented in the dialog visualization 600. By exploring an expandable dialog visualization, an analyst may drill down on problem areas to determine a root cause, and then identify a solution that may remove the problem when a user later tries to achieve the same goal.

In various embodiments, the dialog visualization 600 may be sorted such that the most problematic elements are listed together (e.g., at the top, etc.) to enable easy identification by a user. An element may be problematic when the goal achievement rate for the element or children, and other downstream elements are relatively low compared to other elements. The elements may be color coded to determine if the element is problematic.

In some embodiments, the dialog visualization 600 may include pointers 626 that highlight possible areas of concern. The pointers 626 may be recommendations for further exploration or analysis. In some embodiments, the pointers 626 may be based on one or more of a relatively high number of turns, a low goal attainment rate, associations with other elements classified as problems, and/or other reasons.

Figure 7:
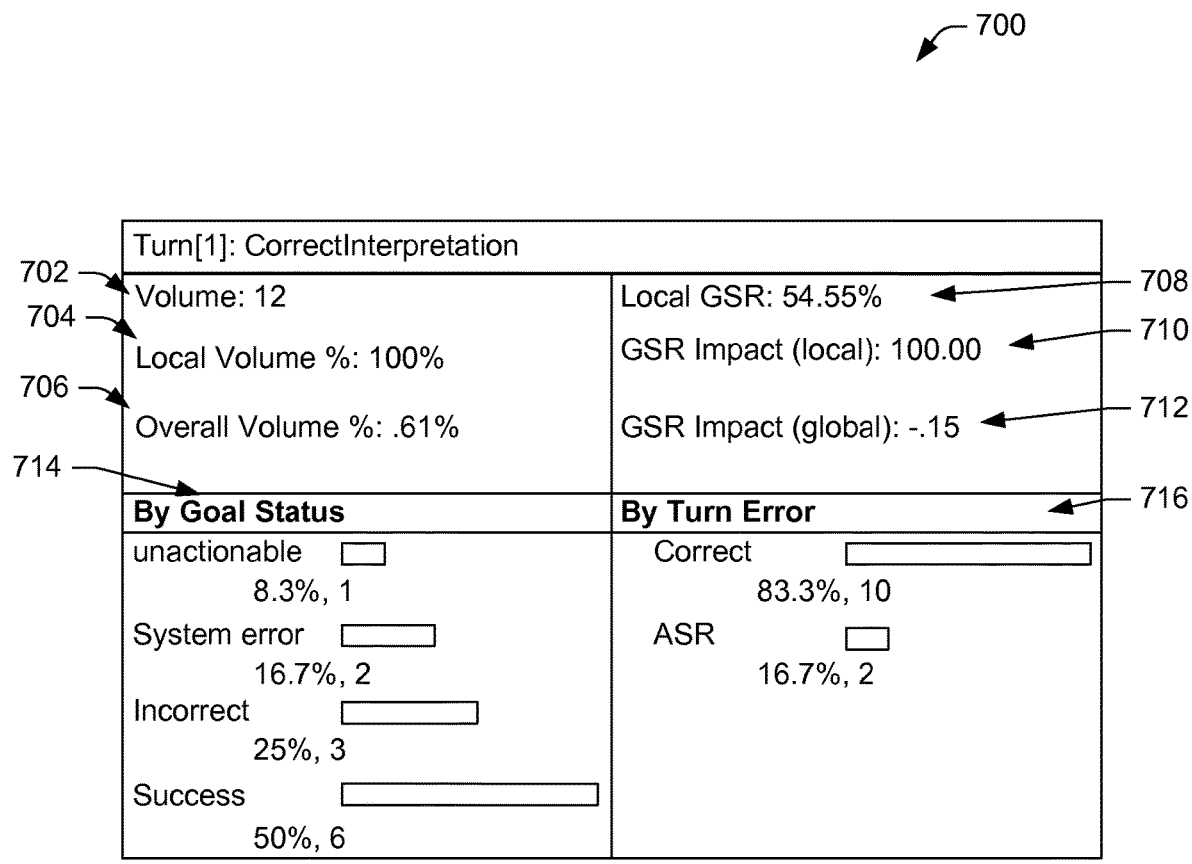
FIG. 7 is a schematic diagram of an illustrative dialog summary.

FIG. 7 is a schematic diagram of an illustrative dialog summary 700. The dialog summary 700 may be the same or similar to the detailed entry 418. The dialog summary 700 may include a volume quantity 702 that indicates a quantity of the occurrences of the element in the raw dialog data 116. A local volume percent 704 may indicate a percent for the selected element, of all the occurrences. An overall volume percent 706 may indicate a percent of all volume of goals. A local goal success rate (GSR) percent 708 indicates a percent of the goal success rate performed locally. This may be determined as follows: [Total Number of success goals] divided by [total number of goals]. A GSR local impact 710 and a GSR global impact 712 show impacts of a child's GSR to the parent GSR, locally and globally (with respect to other elements), respectively. To calculate the impact, the system may discount (ignore) the goals of child node and re-compute the GSR of the parent node. The difference of the new GSR of the parent from the original value is the GSR global impact 712. This technique provides a way to sort the children of a parent. A child with negative GSR impact may be listed before a child with a positive GSR impact. Color coding may also be used to different the elements, which are shown in FIGS. 6A and 6B. In various embodiments, the elements are sorted in a particular way such that the elements enable easy and fast detection of hotspots or problems to address for the users of the tool. The dialog summary 700 may include a turn error section 714 showing a distribution of elements as being correct and being due to automated speech recognition (ASR).

The following illustrative types of information may be presented by an illustrative dialog visualization.

User Turn Type: What did a user do that triggered the goal? A user's response to a system's turn is also called the user turn type. The user's turn type may be approximated with the annotated intent variant.

System turn type: What did system do in response to a user turn? Eleven examples follow showing different types of system turn types.

a. No Response: The system did not generate any response to a user's request.

b. Generic Reprompt: A prompt from the system where it says "Sorry, what was that?", "Sorry?" etc., which are generic in nature. Current a system generally does this in case of low confidence intent handling.

c. Intent Confirm: System confirming the intent, e.g. "Would you like to buy it?" for a purchase intent.

d. Terminal Action Success: Cases when a system does not expect any new information from the user, and ends the interaction from the system's point of view with a success. Note that this does not differentiate if the system played a text-to-speech (TTS) to the user or music. For e.g. "Creating an alarm for 10 mins", as well as playing a song user requested will be under this system turn type.

e. Terminal Action System Abandon: Cases when the system abandoned the goal due to a maximum number of retries by the user.

f. Terminal Action Not Success: Cases when the system thought that it did not do what the user requested. For e.g., if there was a backend service failure, or the song the user requested was not found by the system, those system turns will be classified as this way.

g. Slot Filling Single Slot: Here, the system tries to fill a single slot to make progress in the dialog. For e.g. when the user's request is "I have a question", the system's response is "What is your question". This system turn type will be slot filling single slot.

h. Slot Filling Multi Slot: Here, the system tries to fill multiple slots to make progress in the dialog.

i. Slot Confirm: Here, the system confirms a value of the slot. E.g. "Did you mean the artist, Sting?"

j. Slot Reprompt Single Slot: The system asks a question about a slot whose value was present in the system hypothesized intent.

k. Slot Reprompt Multi Slot: The system asks a question about multiple slots to the user, and at least one of those slots were present in the system hypothesized intent.

Correct Interpretation or not: This represents the truth of what the system did correct or wrong. The exact types are different and are based on the system turn types.

No Response:
  a. Correct: The no response from the system was a valid response.
  b. Incorrect: the system response was incorrect.

Generic Reprompt:
  a. Correct Reject: The user's request was misleading and was a valid system response to ask generic re-prompt question.
  b. False Reject: The intent was misclassified by the system and should have been handled correctly.

Intent Confirm:
  a. Correct: Asking for the intent confirmation was the right thing to do from system's point of view.
  b. Incorrect: Asking for confirming the intent was wrong thing to do, and system should have done something else.

Terminal Action Success:
  a. Correct Accept: A valid system response.
  b. False Accept: An incorrect system response.

Terminal Action System Abandon:
  a. Correct Accept: A valid system response.
  b. False Accept: An incorrect system response.

Terminal Action Not Success:
  a. Correct Accept: The system did the correct thing by terminating the user's request.
  b. False Accept: The system was wrong in terminating the user's request with an invalid response.

Slot Filling Single Slot:
  a. Correct Interpretation: The user's intent was correctly captured, and in reality as well the slot was not provided by the user.
  b. False Interpretation: Either the system captured wrong intent, or the slot that the user provided was mislabeled due to ASR or natural language understanding (NLU) error.

Slot Filling Multi Slot:
  a. Correct Interpretation: The user's intent was correctly captured, and all the slots were not provided by the user.
  b. False Interpretation: Either the system captured wrong intent, or at-least one of the slots that the user provided was mislabeled due to ASR or natural language understanding (NLU).

Slot Confirm:
  a. False Interpretation—Wrong confirmation: Either the system intent was wrong, or the slot confirmation question was about a different slot the user never asked about.
  b. False Interpretation—Correct confirmation: The system's intent was correct, but the slot value the system recognized was different than what the user said. So system asking the user to confirm is moving the goal in the right direction.
  c. Correct interpretation—Incorrect confirmation: The user's intent and slot value was accurately captured by the system, still it resorted to asking a confirmation.

Slot Reprompt Single Slot:
  a. False Interpretation—Wrong slot: Either the system intent was wrong, or the slot reprompt question was about a different slot the user never asked about.
  b. False Interpretation—Correct slot: The system's intent and slot the user is talking about are correct, but the slot value the system recognized was different than what the user said. So system asking the user to repeat is moving the goal in the right direction.
  c. Correct interpretation—Incorrect reprompt: The user's intent and slot was accurately captured by the system, still it resorted to asking the slot value from the user.

Slot Reprompt Multi Slot:
  a. False Interpretation—Wrong slot: Either the system intent was wrong, or the slot reprompt question was about a different slot the user never asked about.
  b. False Interpretation—Correct slot: The system's intent and slot the user is talking about are correct, but the slot value the system recognized was different than what the user said. So system asking the user to repeat is moving the goal in the right direction.

Correct interpretation—Incorrect reprompt: The user's intent and slot was accurately captured by the system, still it resorted to asking the slot value from the user.

Figure 8:
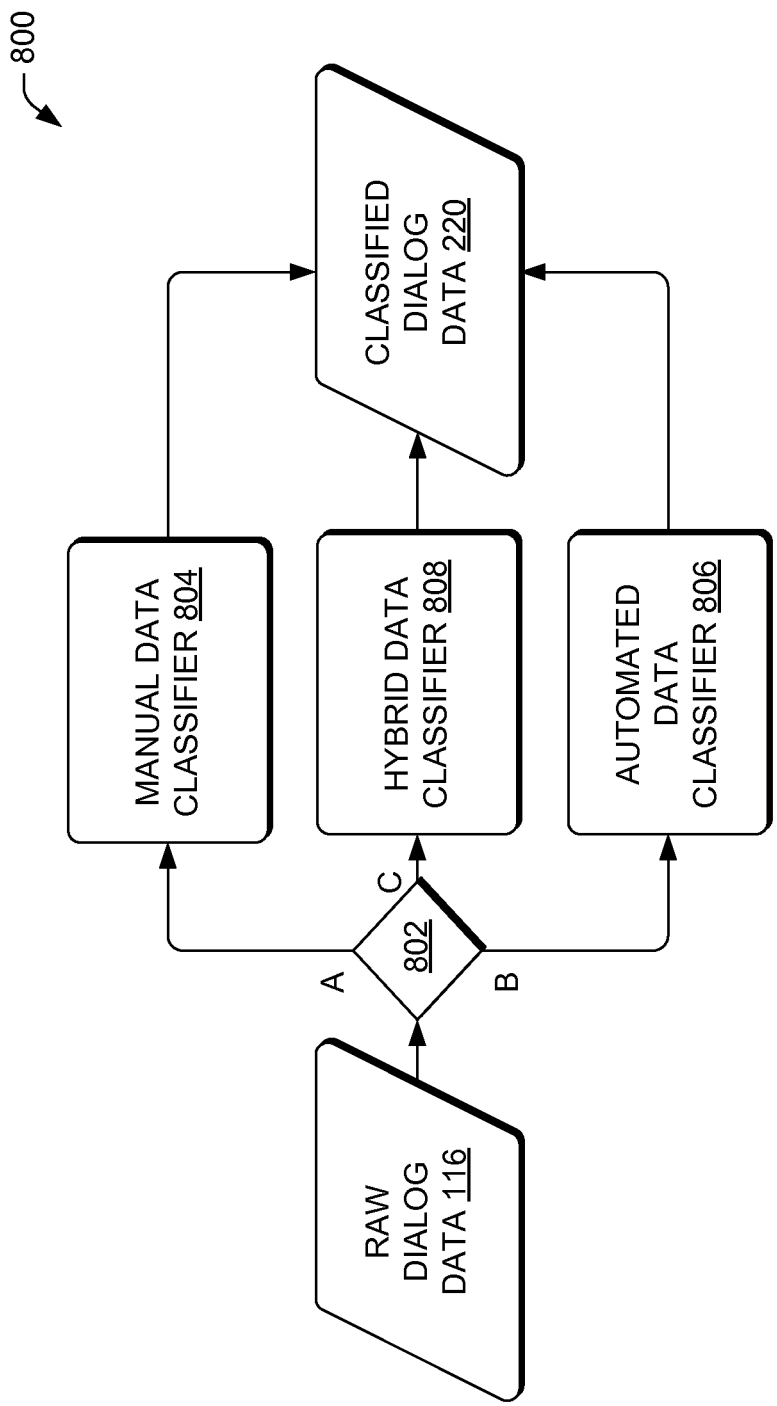
FIG. 8 is a flow diagram of an illustrative process to classify raw data.

FIG. 8 is a flow diagram of an illustrative process 800 to classify raw data. The process 800 is described with reference to the environment 100 and the computing architecture 200, and may be performed by server 114. The input of the process 800 is the raw dialog data 116. This raw data may be processed in different ways to classify the data for further analysis and thus create the classified dialog data 220.

A decision operation 802 represents a selection of a type of classification used to convert the raw dialog data 116 into the classified dialog data 220 following three different paths: Path A leads to use of a manual (human) data classifier 804, Path B leads to use of an automated (machine) data classifier 806, and path C leads to a hybrid data classifier 808 that uses both machine and human input. The classifieds may be implemented by the classification module 210. Each classifier is described in turn.

The manual data classifier 804 may act primarily as a user interface for data input by a person that transcribes a human spoken command received by the user device. By transcribing this using a human, errors due to automated speech recognition (ASR) may be identified. The manual data classifier 804 may also receive designation of different components of the command, such as an identification of a goal, a command, parameters, slots, turns, and/or other relevant data. The manual data classifier 804 may assign an identification number to the exchange and coordinate obtaining system response data. In some embodiments, a recording of an audio output by the user device may also be transcribed by the person to ensure that the devices output is what was intended.

The automated data classifier 806 may automate classification of data. However, the automation of data may be limited to some extent without possibly including similar errors in processing that occur from ASR, for example. However, some analysis may use more accurate ASR algorithms that may not have been deployed for the original exchange due to processing power of devices or other reasons. In some embodiments, the automated data classifier 806 may provide classification of basic attributes, such as a number of turns, a length of time of an exchange, low goal achievement (possibly by way of timeouts, errors, and other clear failures) and other information. This information may be used to determine or select exchanges to be transcribed by humans using the hybrid data classifier 808.

The hybrid data classifier 808 uses aspects of both the manual data classifier 804 and the automated data classifier 806. In some embodiments, some of the data may be classified by a machine (e.g., by the classification module 210) before the person transcribes or otherwise causes further classification of an exchange. The hybrid data classifier 808 may benefit from efficiencies of the automated data classifiers 806 while leveraging accuracy of translation from the manual data classifier 804.

Figure 9:
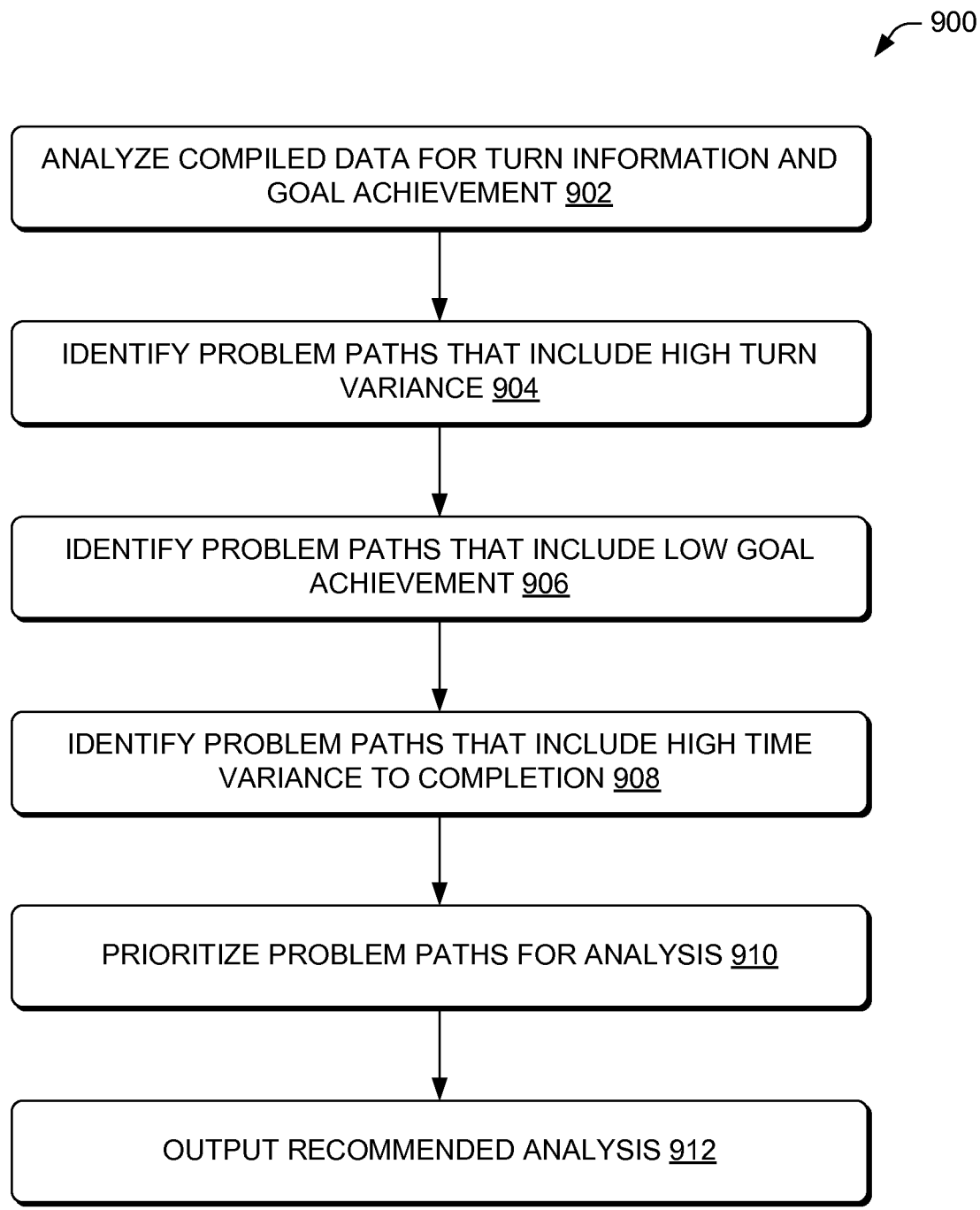
FIG. 9 is a flow diagram of an illustrative process to prioritize analysis of dialogs using dialog visualization.

FIG. 9 is a flow diagram of an illustrative process 900 to prioritize analysis of dialogs using the dialog visualization. The process 900 is described with reference to the environment 100 and the computing architecture 200, and may be performed by server 114.

At 902, the classification module 210 may analyze raw data for turn information and goal achievement metrics. For example, the classification module 210 may identify exchanges that include a relatively large number of turns, a wide range in variance in number of turns, a low goal achievement, and/or other metrics associated with these attributes or other attribute (e.g., total time, etc.). In some instances, the visualization module 214 may perform this analysis, which may use classified data, possibly classified in part by humans.

At 904, the visualization module 214 may identify problem paths (e.g., branches in the tree structure) in the classified data associated with high turn variance. For example, the visualization module 214 may identify exchanges that have some samples where a goal is achieved in few turns while other samples require many more turns, thus creating a high statistical variance. In some embodiments, the visualization module 214 may not have to know whether the goal is achieved, but the number of turns may be known based on automated data classification alone, which may be sufficient for this analysis.

At 906, the visualization module 214 may identify problem paths in the classified data associated with low goal achievement. For example, the visualization module 214 may identify exchanges that frequently result in errors, timeouts, or other issues which do not result in the user achieving a goal. In some embodiments, the actual goal may be unknown since some results (timeouts, errors, etc.) clearly indicate that the goal was not achieved, which may be sufficient of this analysis.

At 906, the visualization module 214 may identify problem paths in the classified data associated with high variance in time of completion. For example, the visualization module 214 may identify exchanges that have some samples where resolution occurs relatively quickly while other samples require many more time, thus creating a high statistical variance. In some embodiments, the visualization module 214 may not have to know whether the goal is achieved, but the amount of time may be known based on automated data classification alone, which may be sufficient for this analysis.

At 910, the visualization module 214 may prioritize problem paths from the operations 904, 906, and 908. The prioritization may be based on scores and/or weight assigned to the various problem paths and/or based on other inputs. The prioritization may rank the problem paths for review and/or otherwise indicate problem paths, such as when displaying the dialog visualization.

At 912, the visualization module 214 may output recommended analysis. The output may be part of the dialog visualization and/or may be output as a task list or other text form that is associated with the dialog visualization. In some embodiments, the problem paths may be coded, via colors, markers, the pointers 626, etc. to draw attention of an analyst.

Figure 10:
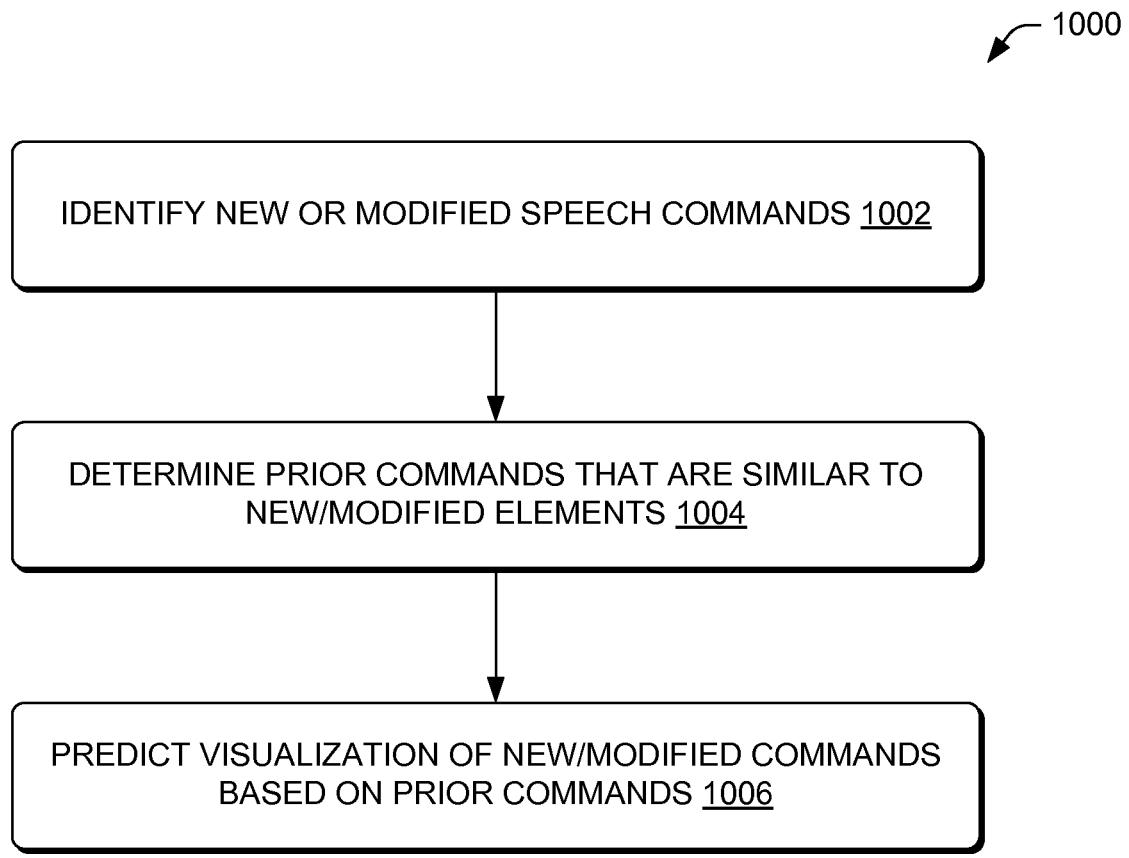
FIG. 10 is a flow diagram of an illustrative process to predict dialog visualizations for a new or modified command, tool, or command set.

FIG. 10 is a flow diagram of an illustrative process 1000 to predict dialog visualizations for a new tool or command set. The process 1000 is described with reference to the environment 100 and the computing architecture 200, and may be performed by server 114.

At 1002, the prediction module 218 may identify new and/or modified commands involving the user devices 104 and/or the services 102 (possibly including a host device). The commands may be settings, software, hardware changes, and/or any other update or change, such as the update from the operation 310 and/or a new task/operation performed by the user devices 104 and/or the services 102. In some embodiments, the predication module 218 may receive an input that identifies the new/modified commands.

At 1004, the prediction module 218 may identify prior commands that are similar to the new/modified commands identified at the operation 1002. The prior commands may be identified based on attributes of the new/modified commands, such as expected number of turns, goals, parameters, key words, slots, and/or other attributes. Thus, the prediction module 218 may find the prior commands in response to the operation 1002.

At 1006, the prediction module 218 may generate a predicted dialog visualization for the new/modified command based on data associated with the prior command. This may allow an analyst to possibly proactively address potential problems and/or problem paths. The dialog visualization may include aspects of multiple different prior commands when multiple prior commands are identified as being associated with the new/modified command. The predicted dialog visualization may be the same as the prior dialog visualizations and/or may be modified to reflect changes due to differences in attributes or other factors between the new/modified command and the prior commands.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

one or more processors; and memory storing computer-executable instructions that, when executed, cause the one or more processors to perform acts comprising:

receiving raw dialog data that captures complete exchanges of dialog between a user and a user device, the raw dialog data including spoken commands uttered by the user and user device responses output by the user device;

processing a portion of the raw dialog data representing the spoken commands using an automated speech recognition (ASR) engine to transform the portion of the raw dialog data into text data;

determining a classification of the spoken commands and the user device responses to identify goals associated with respective ones of the complete exchanges;

receiving query parameters for a specific goal selected from the goals, the query parameters to determine a prioritization for which of the complete exchanges of dialog are to be included as dialog results;

selecting, based upon the specific goal selected from the goals, one or more of the complete exchanges of dialog to include as the dialog results, wherein the dialog results pertain to a common goal, indicate more than one outcome, and indicate a quantity of command/response turns to achieve the common goal; and generating a graphical user interface that represents a dialog visualization of the dialog results in an element structure visualization, the graphical user interface configured to facilitate user interaction with visual representations of the complete exchanges of dialog that are included in the dialog results to facilitate an analysis of the more than one outcome in the dialog results.

2. The system as recited in claim 1, wherein generating the element structure includes generating a tree structure visualization that includes expandable branches that are expandable in response to a detected first selection of one or more first controls included in the graphical user interface, and wherein the computer-executable instructions further cause the one or more processors to perform acts comprising providing additional visual information about one of the complete exchanges by visually revealing, via the graphical user interface, the additional visual information associated with one of the expandable branches in response to a detected second selection of one or more second controls included in the graphical user interface.

3. The system as recited in claim 1, wherein the computer-executable instructions further cause the one or more processors to perform acts comprising classifying at least one attribute of each of the complete exchanges of dialog using a machine data classifier.

4. The system as recited in claim 1, wherein the computer-executable instructions further cause the one or more processors to perform acts comprising:

generating a software update for the user device in response to the user interaction with the user interface;

issuing the software update to the user device that modifies operation of the user device; and revising, at a later point in time, the dialog visualization to visually depict changes following the modified operation of the user device.

5. A method comprising:

determining, by one or more computing devices, data that represents a dialog that includes one or more user commands and one or more user device responses;

receiving, subsequent to an end time of the dialog, a query that requests information associated with the dialog, the query including one or more parameters to determine dialog results representing the dialog;

generating, based at least in part on the dialog results, graphical user interface data that represents a visualization of the dialog;

determine, based at least in part on the visualization of the dialog, at least one of a problematic path or user difficulty associated with the dialog based at least in part on a number of turns regarding a desired result associated with the dialog; and causing the visualization of the dialog to be updated to emphasize the at least one of the problematic path or the user difficulty associated with the dialog.

6. The method as recited in claim 5, wherein the generating the graphical user interface data includes grouping element structure elements that represent groupings of at least one of the one or more user commands or the one or more user device responses using at least one of a percentage of goal achievement or a quantity of command/response turns associated with each of the element structure elements.

7. The method as recited in claim 5, further comprising classifying, via a machine data classifier, at least one of the one or more user device responses as at least one of a timeout, an error, or storage of data caused in response to one of the one or more user commands.

8. The method as recited in claim 5, further comprising communicating, by a user device associated with at least one of the one or more user commands or the one or more user device responses, with third party services, and wherein the one or more user device responses are at least partly generated by the third-party services.

9. The method as recited in claim 5, further comprising assigning a unique identifier to each complete exchange associated with a set of dialogs, and wherein the creating the visualization includes organizing the dialog among the dialog results at least partly based on the unique identifiers.

10. The method as recited in claim 5, further comprising organizing the visualization using a tree structure.

11. The method as recited in claim 10, wherein the tree structure initially includes a first level element that is connected to second level elements by branches, and further comprising expanding at least some of the branches, via interaction with the graphical user interface data, to reveal additional elements in response to user selection.

12. The method as recited in claim 5, further comprising organizing the visualization using a cluster diagram.

13. The method as recited in claim 5, further comprising:

issuing an update to a user device associated with at least one of the one or more user commands or the one or more user device responses, the update causing modification of an operation of the user device; and revising, at a later point in time, the visualization to visually depict changes following the modified operation of the user device.

14. The method as recited in claim 5, further comprising automatically adding pointers to the visualization to indicate possible problem areas in the dialog results.

15. The method as recited in claim 5, where the creating the graphical user interface data includes grouping the elements using visual codes that are associated with attributes of element structure elements that represent groupings of at least one of the one or more user commands or the one or more user device responses, the visual codes including at least one of different sized icons or color codes.

16. A system comprising:

one or more processors; and memory to store computer-executable instructions that, when executed, cause the one or more processors to:

determine data that represents a dialog that includes one or more user commands and one or more user device responses;

receiving, subsequent to an end time of the dialog, a query that requests information associated with the dialog, the query including one or more parameters to determine dialog results representing the dialog;

generate, based at least in part on the dialog results, graphical user interface data that represents a visualization of the dialog;

cause, based at least in part on the visualization of the dialog, an action to be performed to reduce or eliminate one or more problematic paths associated with a desired result associated with the dialog; and causing the visualization of the dialog to be updated to emphasize the one or more problematic paths associated with the desired result associated with the dialog.

17. The system as recited in claim 16, wherein the visualization includes element structure elements that represent groupings of at least one of the one or more user commands or the one or more user device responses, the graphical user interface data configured for interaction with and exploration of different outcomes in at least a portion of the dialog, the element structure elements being selectable to follow decisions leading to the different outcomes, and wherein the computer-executable instructions further cause the one or more processors to expand the element structure elements to reveal additional branches in response to user interaction with the graphical user interface data.

18. The system as recited in claim 16, wherein the computer-executable instructions further cause the one or more processors to predict a different visualization associated with a new task based at least in part on an association of the new task with an existing goal.

19. The system as recited in claim 16, wherein the computer-executable instructions further cause the one or more processors to classify raw data using automated data classification to generate at least some of the data.

20. The system as recited in claim 16, wherein the computer-executable instructions further cause the one or more processors to predict, based at least in part on the visualization, one or more potential outcomes for at least one of a task, a command, or an operation that has yet to be received.

* * * * *